US012194483B2

(12) United States Patent
Goettke et al.

(10) Patent No.: US 12,194,483 B2
(45) Date of Patent: Jan. 14, 2025

(54) PUMP FOR DISPENSING A FLUID

(71) Applicant: Promens SA, Bellignat (FR)

(72) Inventors: Sabine Goettke, Lohne (DE); Gwénael Doulin, Sainte Euphémie (FR); Pascal Hennemann, Vaux les St. Claude (FR)

(73) Assignee: Promens SA, Bellignat (FR)

( * ) Notice: Subject to any disclaimer, the term of this patent is extended or adjusted under 35 U.S.C. 154(b) by 225 days.

(21) Appl. No.: 17/927,958

(22) PCT Filed: May 28, 2021

(86) PCT No.: PCT/EP2021/064439
§ 371 (c)(1),
(2) Date: Nov. 28, 2022

(87) PCT Pub. No.: WO2021/239991
PCT Pub. Date: Dec. 2, 2021

(65) Prior Publication Data

US 2023/0201852 A1 Jun. 29, 2023

(30) Foreign Application Priority Data

May 29, 2020 (GB) ..................................... 2008086
Dec. 11, 2020 (GB) ..................................... 2019553

(51) Int. Cl.
*B05B 11/00* (2023.01)
*B05B 11/10* (2023.01)
(Continued)

(52) U.S. Cl.
CPC ...... *B05B 11/1077* (2023.01); *B05B 11/1023* (2023.01); *B05B 11/1047* (2023.01);
(Continued)

(58) Field of Classification Search
CPC ............ B05B 11/1077; B05B 11/1035; B05B 11/1001; B05B 11/1074
(Continued)

(56) References Cited

U.S. PATENT DOCUMENTS 4,050,613 A 9/1977 Corsette
5,152,434 A 10/1992 Birmelin
(Continued)

FOREIGN PATENT DOCUMENTS

DE 44 41 263 A1 5/1996
DE 10 2008 023 521 A1 9/2009
(Continued)

OTHER PUBLICATIONS

Notification of Transmittal of the International Search Report and Written Opinion of the International Searching Authority, or the Declaration, along with the International Search Report and Written Opinion of the International Searching Authority in PCT/EP2021/064439, mailed Sep. 14, 2021.
(Continued)

*Primary Examiner* — Charles P. Cheyney
(74) *Attorney, Agent, or Firm* — Collard & Roe, P.C.

(57) ABSTRACT

A pump for dispensing a fluid, has a pump head, a piston body with a piston, a pump chamber limited by a pump chamber body, an inlet valve and an outlet valve, the piston being moveable by respective movement of the pump head between an upper starting position and a lower end position. A return stroke force for a return stroke from the lower end position into the upper starting position is provided by a bellows, formed by two bellows arranged one above the other, Each of the bellows is folded up, when moving the pump head into the lower end position, by exerting a compression force on the pump head, the first bellows receiving the compression force by direct engagement with
(Continued)

the pump head, the second bellows receiving the compression force only by engagement with the first bellows.

10 Claims, 15 Drawing Sheets

(51) Int. Cl.
*F04B 19/04* (2006.01)
*F04B 53/14* (2006.01)

(52) U.S. Cl.
CPC ...... *B05B 11/1053* (2023.01); *B05B 11/1059* (2023.01); *B05B 11/1069* (2023.01); *B05B 11/1074* (2023.01); *B05B 11/1094* (2023.01); *F04B 19/04* (2013.01); *F04B 53/14* (2013.01)

(58) Field of Classification Search
USPC .................... 222/207, 321.6, 321.7; 417/472
See application file for complete search history.

(56) References Cited

U.S. PATENT DOCUMENTS

| | | | | |
|---|---|---|---|---|
| 5,238,156 A * | 8/1993 | Andris | B05B 11/1074 222/207 |
| 5,746,728 A * | 5/1998 | Py | A61F 9/0008 222/207 |
| 5,979,711 A * | 11/1999 | Fuchs | B05B 11/0005 222/321.2 |
| 6,053,364 A | 4/2000 | Van Der Heijden | |
| 6,073,814 A * | 6/2000 | Fuchs | B05B 11/1018 222/321.9 |
| 6,209,760 B1 * | 4/2001 | Fuchs | B05B 11/1035 222/207 |
| 7,063,235 B2 * | 6/2006 | Auer | B05B 11/1084 222/135 |
| 7,367,478 B2 * | 5/2008 | Fuchs | B05B 11/1035 222/378 |
| 8,616,414 B2 * | 12/2013 | Ciavarella | B05B 7/0037 222/207 |
| 2003/0230600 A1 | 12/2003 | Masuda | |
| 2004/0188464 A1 | 9/2004 | Auer | |
| 2018/0056314 A1 | 3/2018 | Schroeder | |
| 2020/0215560 A1 | 7/2020 | Passetti | |
| 2021/0340971 A1 * | 11/2021 | Ki | B05B 11/1077 |
| 2023/0034207 A1 * | 2/2023 | Zandon | B05B 11/1035 |
| 2023/0074980 A1 * | 3/2023 | Zembrod | F04B 45/02 |
| 2023/0204085 A1 * | 6/2023 | Ki | F16F 1/3605 |
| 2023/0311144 A1 * | 10/2023 | Knight | B05B 11/1077 |

FOREIGN PATENT DOCUMENTS

| | | | |
|---|---|---|---|
| EP | 1 364 719 | A1 | 11/2003 |
| EP | 1 384 517 | A2 | 1/2004 |
| WO | 94/20221 | A1 | 9/1994 |
| WO | 9628257 | A1 | 9/1996 |
| WO | 2012/104694 | A1 | 8/2012 |
| WO | 2016/079685 | A1 | 5/2016 |
| WO | 2022/038194 | A1 | 2/2022 |

OTHER PUBLICATIONS

Written Opinion of the International Preliminary Examining Authority in PCT/EP2021/064439, mailed Apr. 5, 2022.
International Preliminary Report on Patentability in PCT/EP2021/064439, dated Aug. 25, 2022.

* cited by examiner

Fig. 8
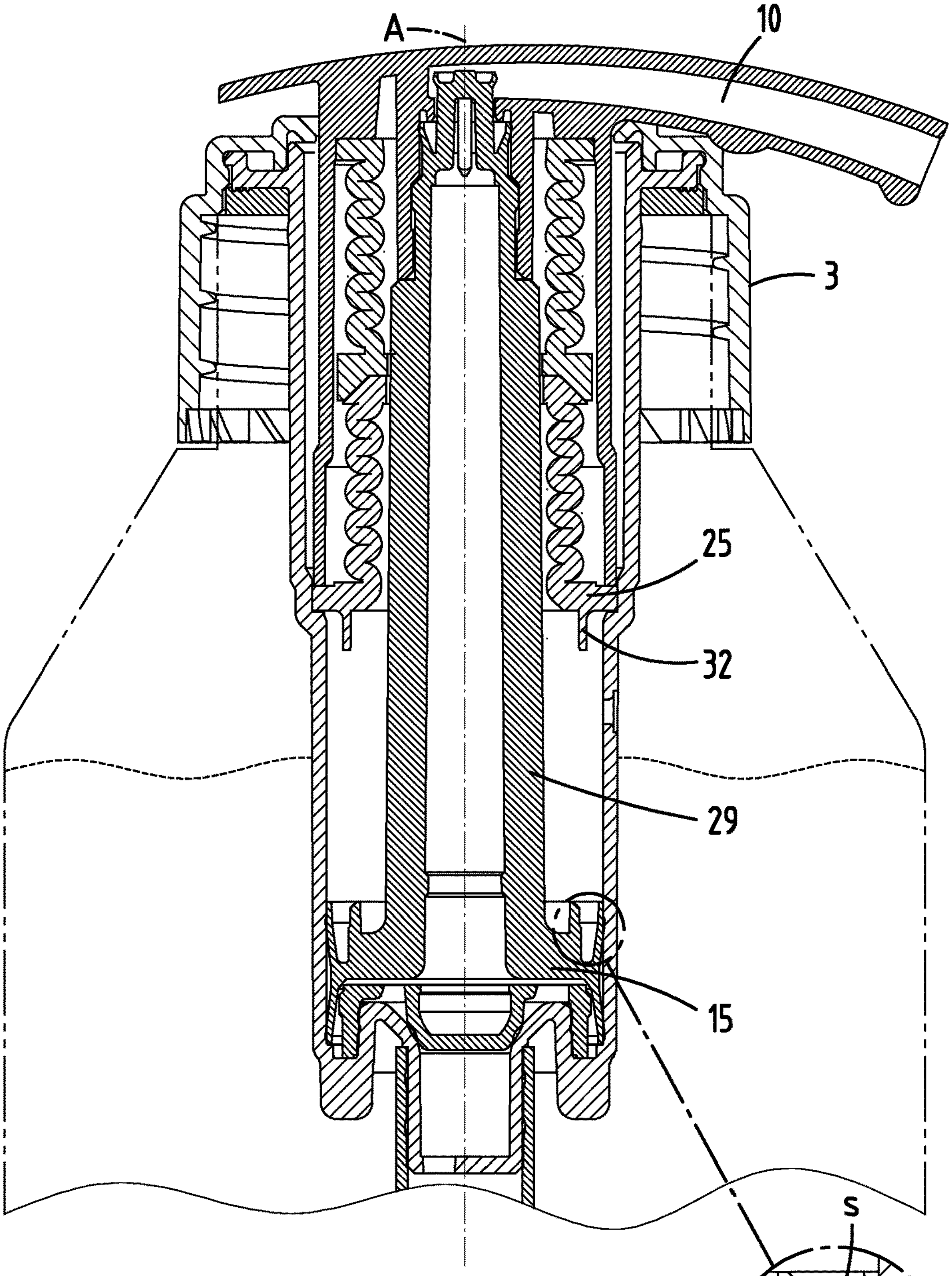
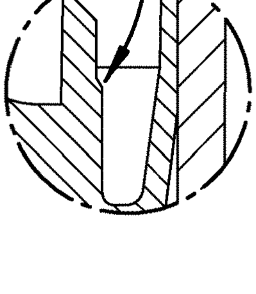
Fig. 8a

Fig. 14
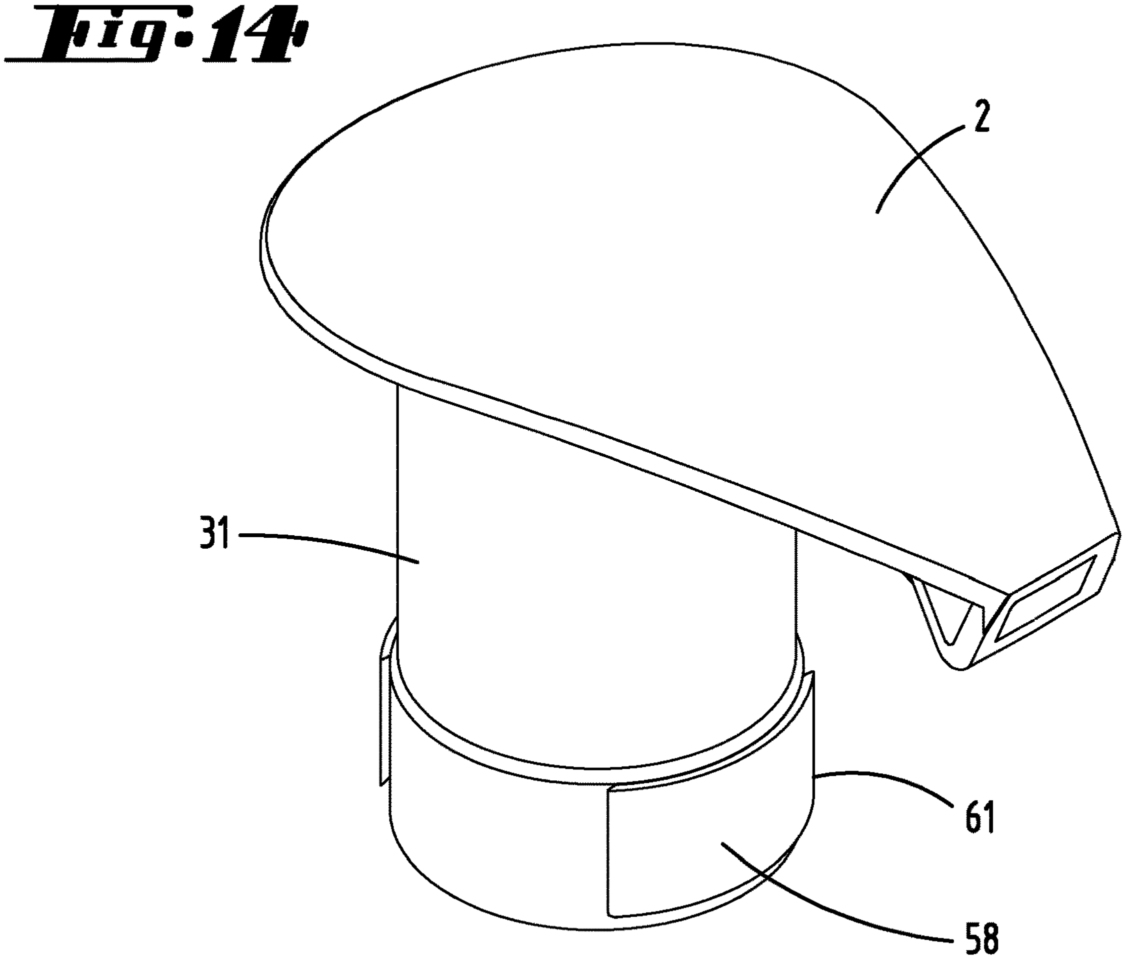
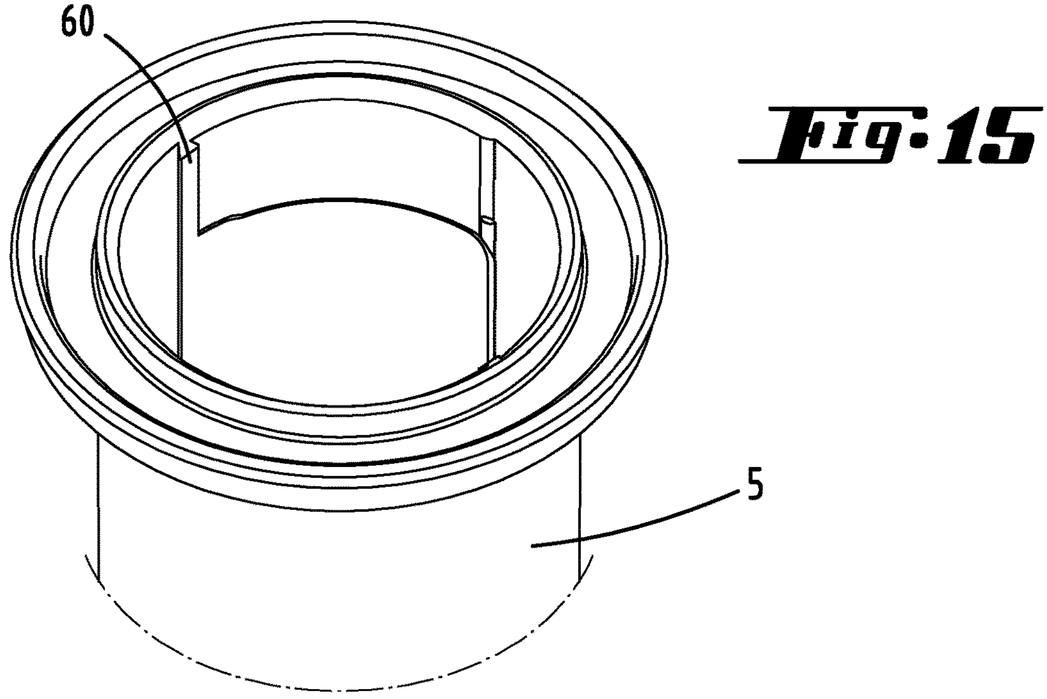
Fig. 15

PUMP FOR DISPENSING A FLUID

CROSS REFERENCE TO RELATED APPLICATIONS

This application is the National Stage of PCT/EP2021/064439 filed on May 28, 2021, which claims priority under 35 U.S.C. § 119 of British Application No. 2008086.7 filed on May 29, 2020 and British Application No. 2019553.3 filed on Dec. 11, 2020, the disclosures of which are incorporated by reference. The international application under PCT article 21(2) was not published in English.

BACKGROUND OF THE INVENTION

1. Field of the Invention

The invention is concerned with a pump for dispensing a fluid, with a pump head, a piston body with a piston, a pump chamber limited by a pump chamber body, an inlet valve and an outlet valve, the piston being moveable by respective movement of the pump head between an upper starting position and a lower end position, wherein further a return stroke force for a return stroke from the lower end position into the upper starting position is provided for.

2. Description of the Related Art

Such pumps, especially pumps having a bellows as a restoring means are known in the art. For example is referred to US 2018/0 056 314 A1 and US 2004/0 188 464 A1. Concerning pumps is further to refer to US 2003/0 230 600 A1 and U.S. Pat. No. 6,053,364 A. EP 1 384 517 A2 does disclose a pump with two bellows, one above the other. The upper bellows is for opening the outlet valve. After the outlet valve is opened, the upper bellows is not further compressed, whereas the lower bellows is only compressed during the pumping stroke, which only starts after the outlet valve is opened. The lower bellows is engaged directly by the pump head.

WO 2012/104694 A1 does disclose a pump with a bellows for providing a return stroke force. The one part bellows may have two opposed truncated portions, narrowing both to a common middle portion.

The bulges of the bellows are in a cross-section following a curved line.

U.S. Pat. No. 5,238,156 A does disclose a pump for dispensing a fluid having an element which provides both, a bellows-like portion as well as a straight wall portion. The straight wall portion is making up for the pump chamber. At the transition of the bellows-like portion to the straight wall portion an inwardly projecting check collar is provided for, having in a cross-section a triangle configuration.

U.S. Pat. No. 4,050,613 A does also disclose a pump for dispensing a fluid with a pump head and a piston body. The pump has further a pump housing part with a sealing rim being in sealing engagement with a sealing shoulder on the pump head wall. The sealing rim has in a cross-section a triangle configuration or is in a configuration of an horizontal extending wall, wherein in both cases the configuration has a flattened edge being in contact with the outer surface of the pump head wall. When in engagement, there is a tendency to widen such configuration.

In view of a pump having a bellows for providing the return stroke force, due to especially manufacturing limitations, the return stroke way is rather limited in case one would not like to accept remarkably higher production costs for a bellows having a long enough length for allowing a larger pumping and return stroke.

A bellows may further have, when getting compressed, an uneven wrapping behavior over the circumference and the height of the bellows.

Whereas the piston usually has one or preferably two lips, seen in a cross section, engaging an inner surface of the pump chamber body in order to seal the pump chamber during a pump stroke and even in the upper starting position, such sealing may not always be sufficient. In this respect, especially when having a bellows as restoring means, a further improvement of the tightness is an object.

SUMMARY OF THE INVENTION

In view of the state of the art referred to, therefore, a first object of the invention is to provide a pump for dispensing a fluid being even with a comparatively large compression stroke advantageously to manufacture, when using a bellows as a restoring means.

A further object is to provide such pump for dispensing a fluid having a bellows as restoring means with the bellows being advantageously compressable in view of its bulges.

A still further object of the invention is to provide such pump for dispensing a fluid with a bellows with a bellows as restoring means having an improved sealability concerning the piston and thereby the pump chamber.

A still further object of the invention is concerning such pump for dispensing a fluid, wherein there is a sealing between a pump head skirt and a pump housing part, the pump head skirt being in at least a starting position in a sealing engagement with the pump housing part, having an improved sealability.

In order to solve one of the problems outlined, according to a first aspect of the invention, in view of a possibly enlarged pumping stroke, two bellows are arranged one above the other, a first bellows and a second bellows, each of the bellows is an independent bellow being not connected to each other but are only lying with upper and lower abutment surfaces on each other. Each of the bellows is folded up, when moving the pump head into the lower end position, by exerting a compression force on the pump head, the first bellows receiving the compression force by direct engagement with the pump head, the second bellows receiving the compression force only by engagement with the first bellows.

A pump is proposed thereby, which has two bellows arranged one behind the other, in series, such that they may function in use as a long continuous bellows. At a usual use of the pump, the two bellows are one above the other. During the pumping stroke, both bellows continuously and preferably equally do fold up. A much longer stroke is possible then with each one of the bellows alone. The pump head is only acting directly on one of the bellows, such as the lower end of one of the bellows is only in direct contact with a pump part being fixed during the pumping stroke, representing a lower abutment for this bellows and both these bellows.

Two bellows, each of them being good to manufacture, can be combined one above the other to allow for a longer pumping stroke. In such case and preferably, the bellows, which further preferably have a generally cylindrical form, have at least generally the same inner and outer diameters, such that they without furthers fit together, when arranged one above the other.

In view of an advantageously compressibility of such bellows, wherein it is not of importance, whether in such pump are one or two bellows provided for, according to a further teaching of the invention is proposed a bellows with different angles as to surfaces, an upper and a lower surface, of one or more or all of its bulges. A bulge is having general in a cross section an upper straight surface and a lower straight surface. These surfaces merge radially outside, as well as radially inside, preferably, by a curvature. Looking at the said straight surfaces in a longitudinal cross section of the bulge or the bellows as such, concerning the merging radially outwards, a first acute angle in said cross section between the upper straight surface and a line being at a right angle to a compression direction or a middle longitudinal axis of the bellows respectively, is larger than a second acute angle in said cross section between the lower straight surface and the said line, wherein further the first angle is between 38° and 48° and the second angle is between 25° and 32°. Thereby, during compression of the bulge a controlled wrapping is initiated. The straight surface having the smaller acute angle is less rigid than the surface having the greater acute angle and will therefore first bend upon respective force.

The compression direction does coincide with a longitudinal extension of a bellows, between an upper and a lower end of the bellows. At an assembled pump, especially a pump as described here as possible embodiment, a longitudinal length axis of the bellows will coincide preferably with a middle axis of the pump as such.

In view of the sealability of the piston and especially the pump chamber, a further teaching of the invention provides a bellows that has a sealing lip which is circumferentially continuously running and a general cylindrical part extending downwards from a lower shoulder and being in an engagement with an outer surface of the piston, the outer surface being radially inward to a second sealing lip of the piston, and that the piston has a circumferentially continuously given groove, wherein an outer wall of the groove provides for the sealing lip and an inner wall of the groove provides for the surface being in sealing engagement with the first sealing lip in the upper, starting position of the piston. Thereby is a direct sealing between the bellows and the piston or piston body possible.

Even in case there would be a leakage with respect to lips provided for at the piston in order to seal against an inner surface of the pump chamber body, the tightness could be maintained or be improved. The said sealing can easily be provided for by a part of the bellows being preferably one part with the bellows and materially uniform with the bellows.

In view of having an advantageously sealing of the pump, especially in the starting position, a further teaching of the invention, which does not necessarily have a bellows as restoring spring is given in that the pump head wall provides an outer surface of the pump head and the upper starting position, that the pump head housing part has at its inner edge an engaging wall, extending in a cross-section in an oblique extending free ending wall part, at an angle of 40-50° with respect to the axis, such that it runs from a higher radially outward diameter to a lower radial inward diameter, and that further the wall part has a certain flexibility when the pump head is possibly engaging with the wall part when moving downwards and a certain stiffness when engaging a shoulder provided for at the wall, in an upward movement direction of the pump head, in which case the shoulder tends to bend the wall upwards, resulting in a narrowing of the free diameter at the inner free edge of the wall, thereby enhancing the engagement between the engaging wall and the pump head wall, which free edge further makes up for the engagement between the wall part and the wall.

In further detail concerning the two or more bellows arranged one above the other it is preferred, that a lower end surface of an upper bellows is lying directly and immediately on an upper end surface of the lower bellows, the end surfaces are preferably made unitary and materially uniform with each of the respective bellows.

The said surfaces may further, according to a further preferred embodiment, being nested together. As to this, both of the surfaces may be in a cross-section have a step-like contour, an upper step-like contour and a lower step-like contour or an outer step-like contour and an inner step-like contour respectively. Preferably one of the bellows has an outer step, in which the other bellows lies with an inner step. Thereby, especially a good stability in radial direction at the junction of the bellows is given.

Such step-like configuration can be made in a different embodiment also by respective oblique surfaces. The oblique surfaces as well as respective part surfaces of the step-like contours are preferably running straight, such that the bellows do lie on each another over a certain length of such oblique surfaces. In a cross-section, the oblique surface may run from an upper radial outward point to a lower radial inward point or vice versa.

As far as below and hereafter is referred to upper and lower, this is always meant in an outward delivering direction of the fluid pumped with such pump as described here. Concerning an outward direction of the fluid, from the pump chamber to a pump head fluid channel and finally through an outlet opening, is referred also to as flowing in an upper direction.

Concerning the two bellows being arranged one above the other, a still further preferred embodiment provides for both of these bellows having thread-like running bulges. More specifically, it is preferred that in such case the threads have an opposite pitch. When compressing a bellows having such thread-like running bulges, due to the thread-like extension, there might be a certain circumferential force resulting on the upper and/or lower surfaces of the bellows. When having two of these bellows above each other with opposite pitches, it is possible to reach that the said effects are offset against each other. No detrimental effect may occur due to the thread-like orientation of the bulges.

As far as bellows are concerned, independent of whether there are one or two or more bellows above each other or whether such bellows has angles as described before therewith, a further preferred embodiment provides a thread-like extension of such bulges. One or more of the bulges will run like a thread in a circumferential direction of the bellows. As mentioned, also for such thread-like extending bulges the said angles as disclosed before may exist and it is preferred to have the arrangement as outlined before in view of these angles.

BRIEF DESCRIPTION OF THE DRAWINGS

Further, the invention is explained in view of the enclosed drawings, which show.

Figure 5:
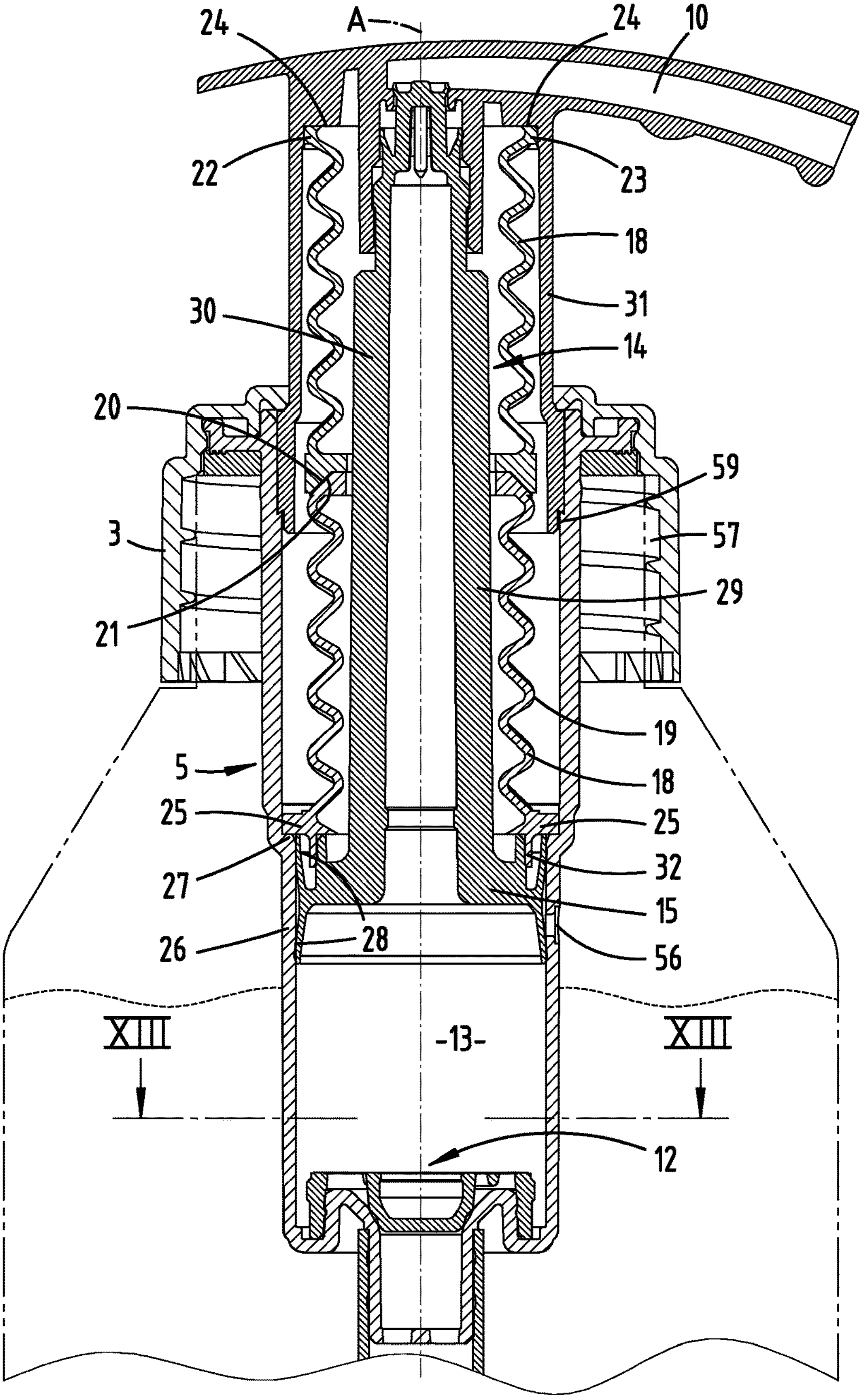
Figure 6:
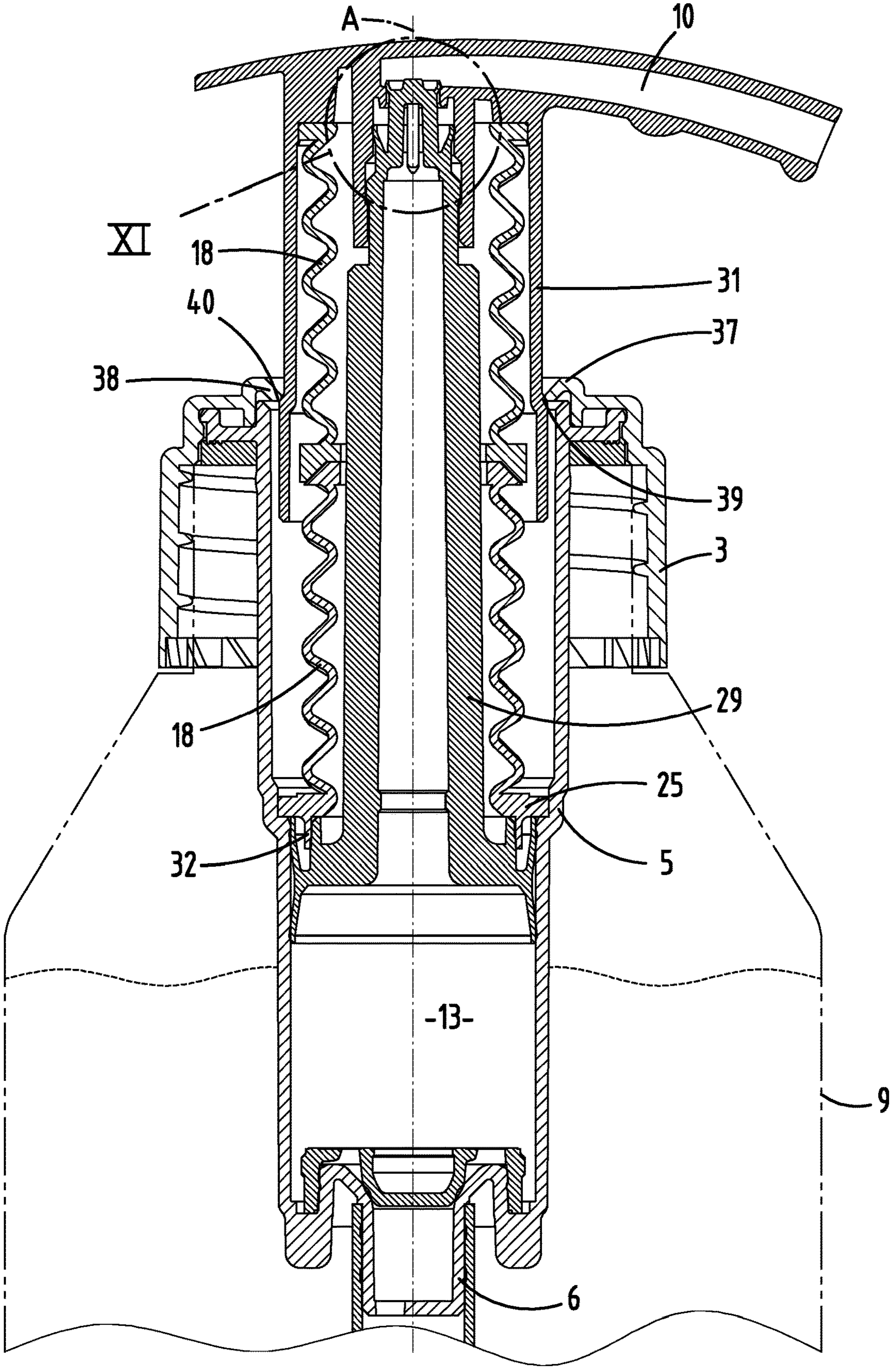
Figure 7:
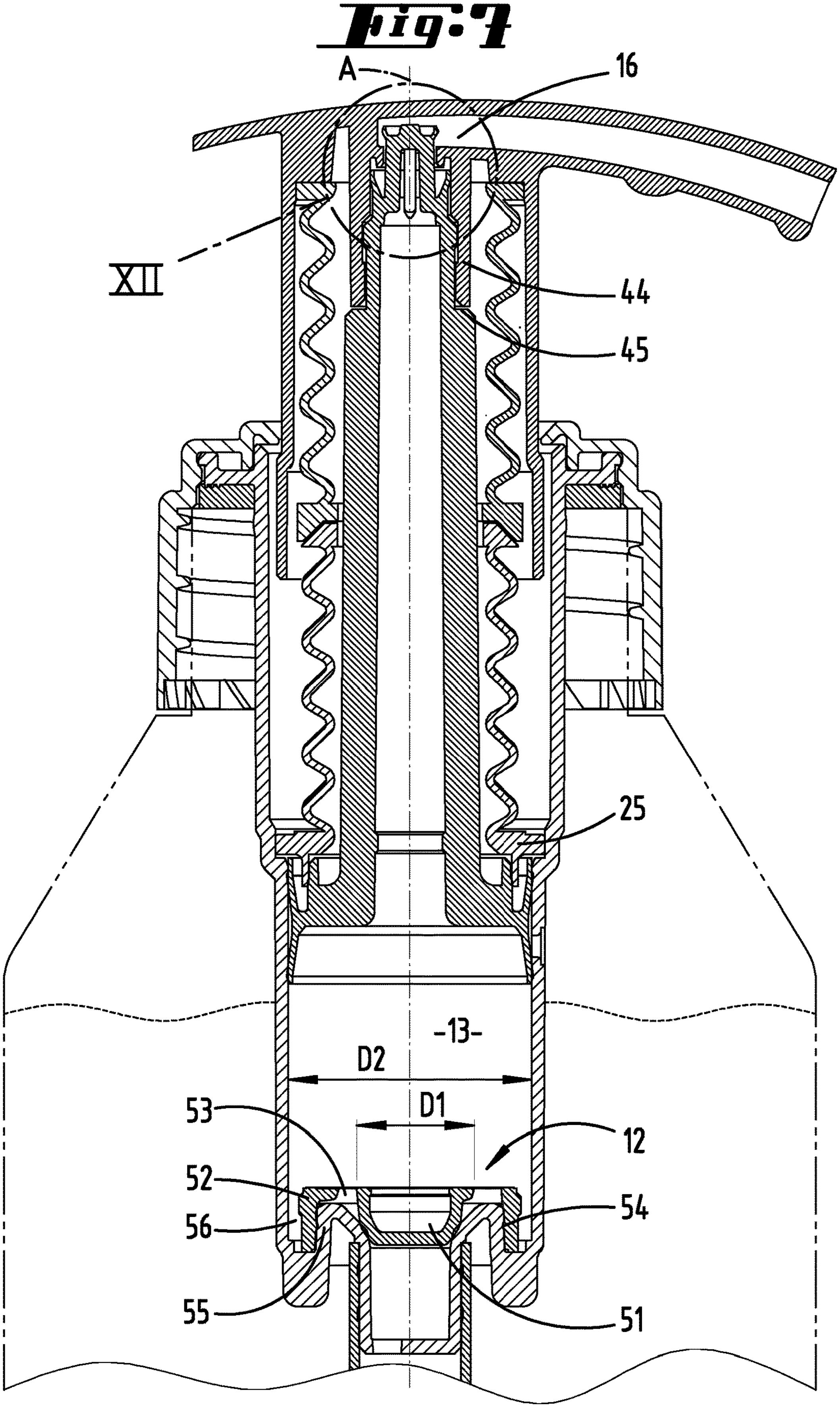
Figure 9:
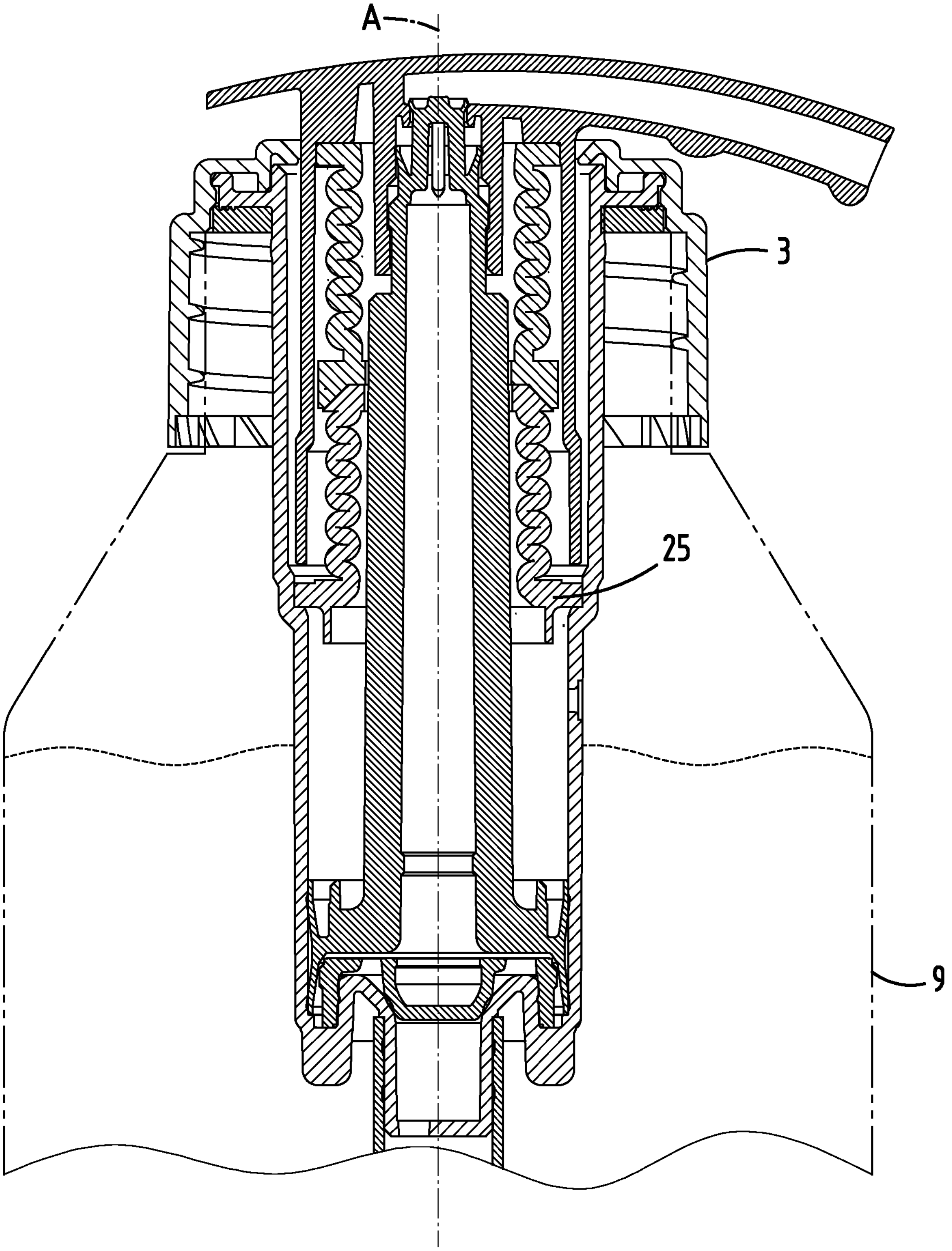
Figure 10:
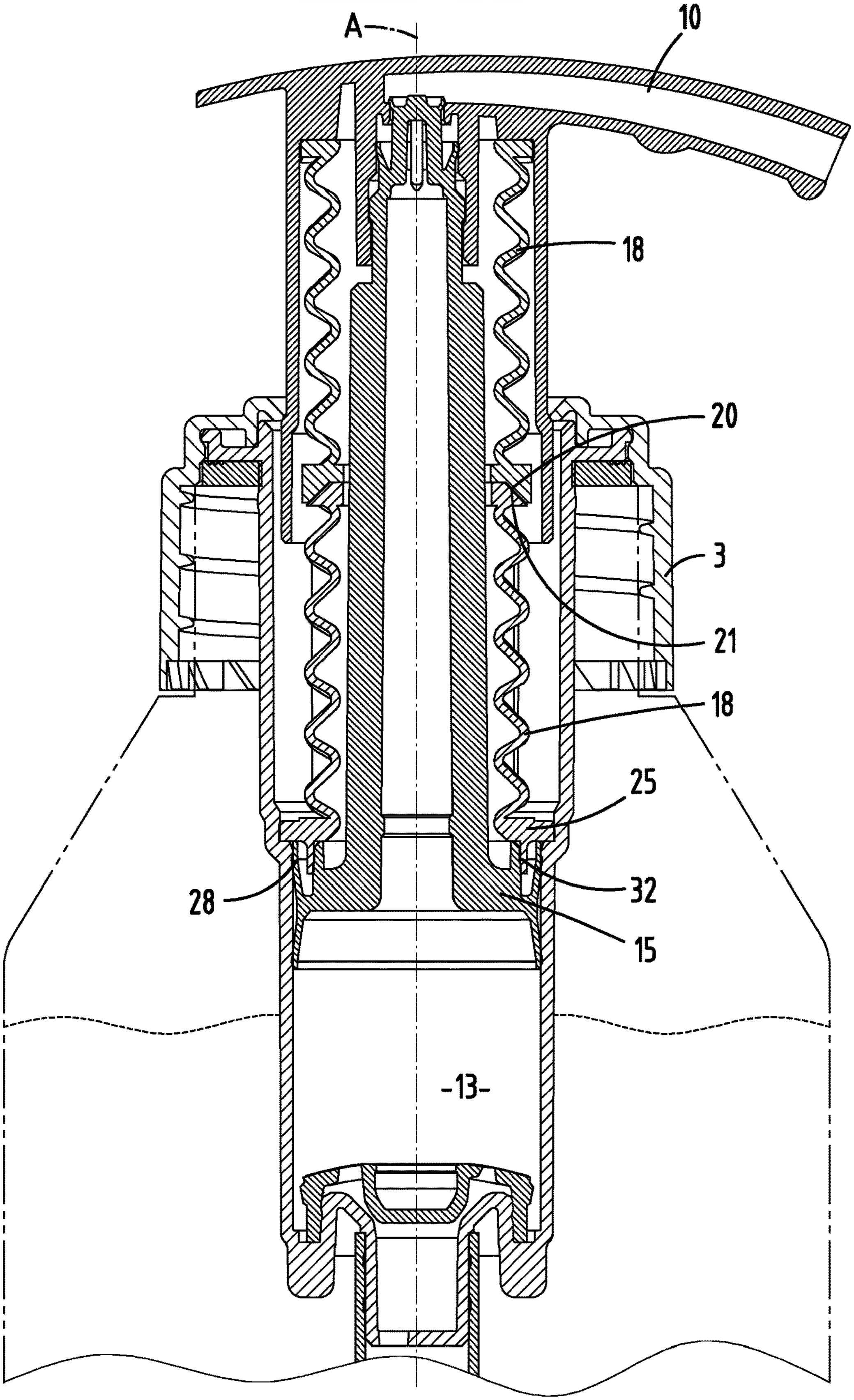
Figure 11:
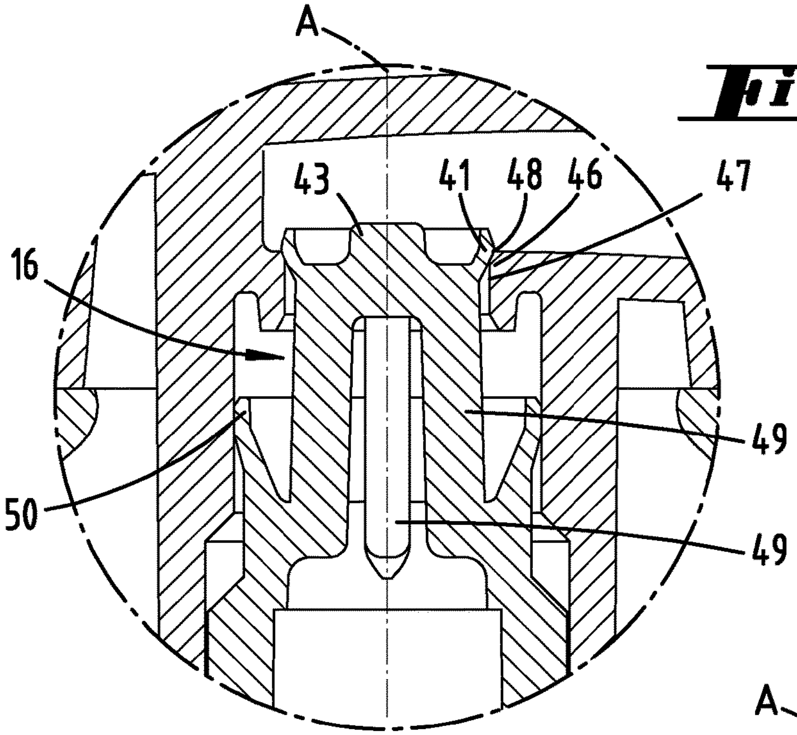
Figure 12:
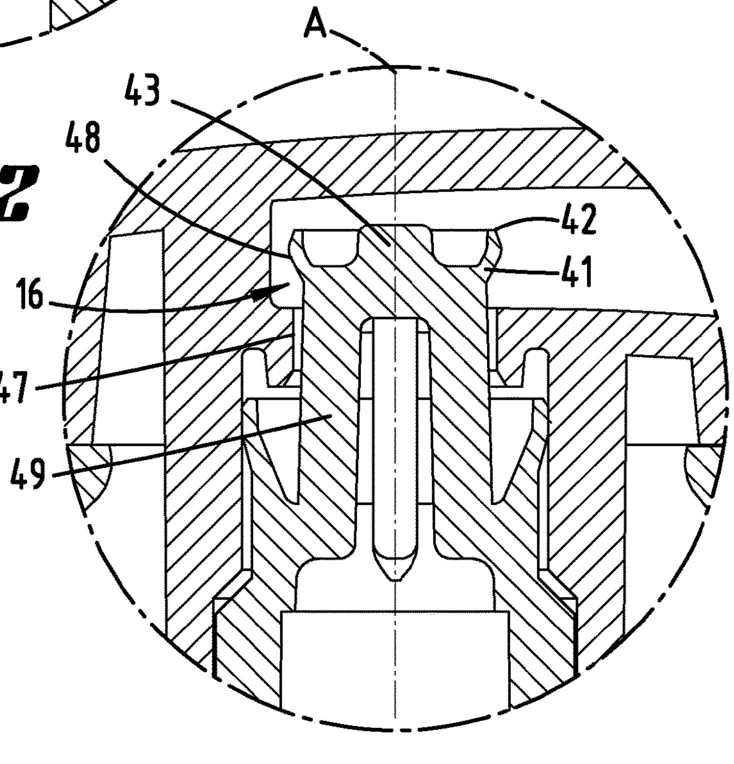
Figure 13:
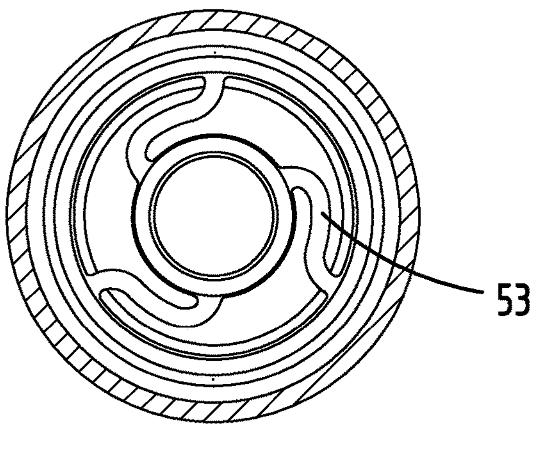
Figure 16:
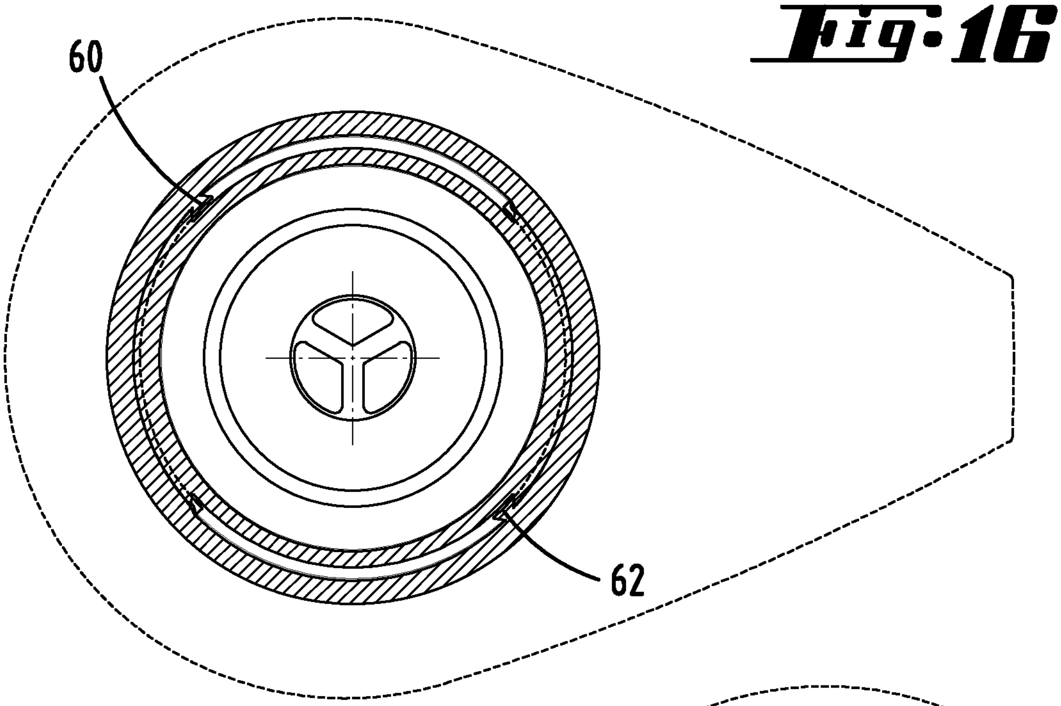
Figure 17:
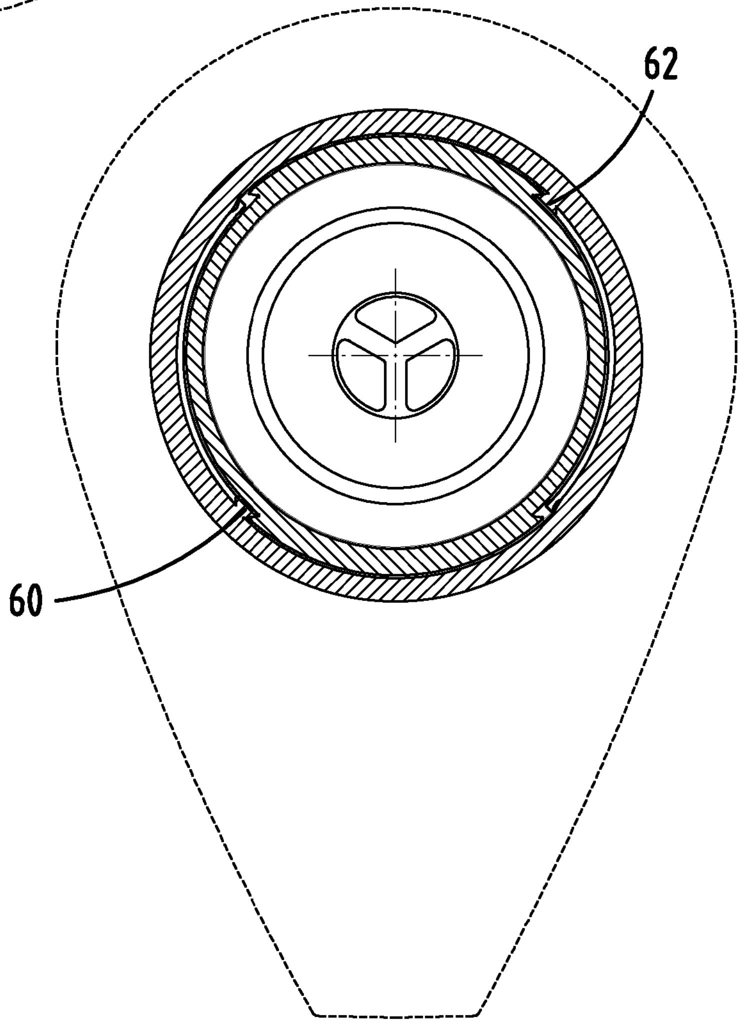
Figure 18:
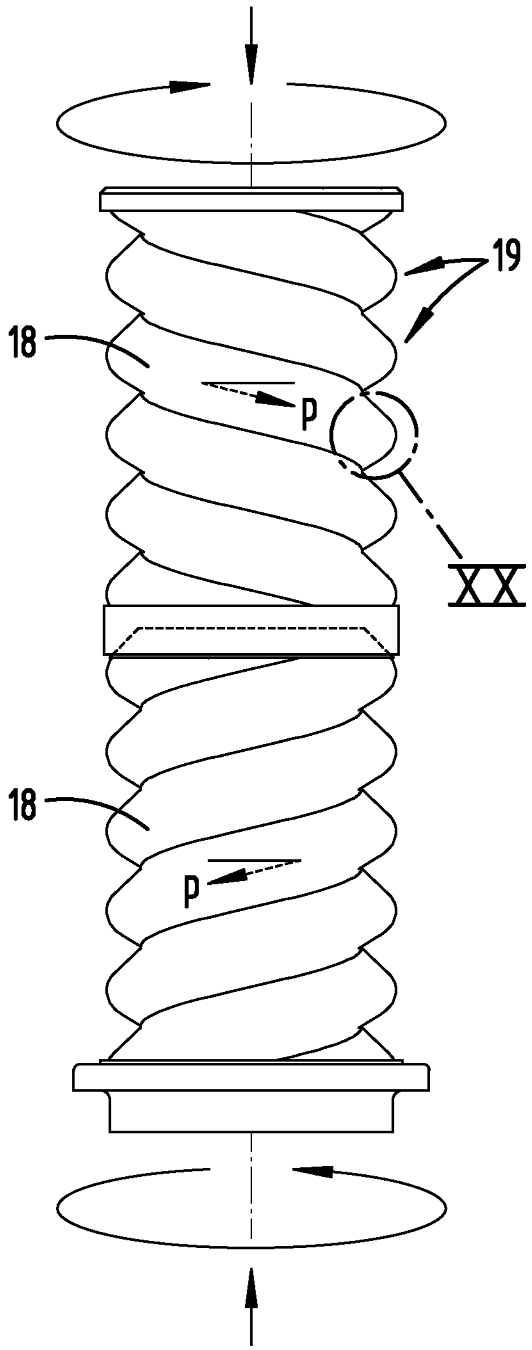
Figure 19:
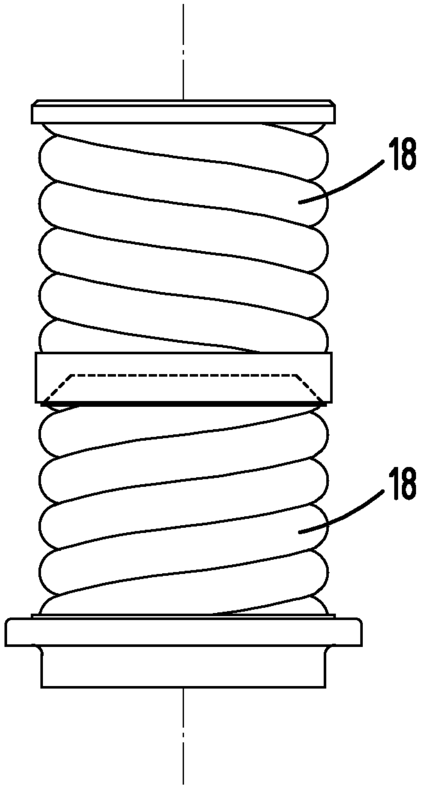
Figure 20:
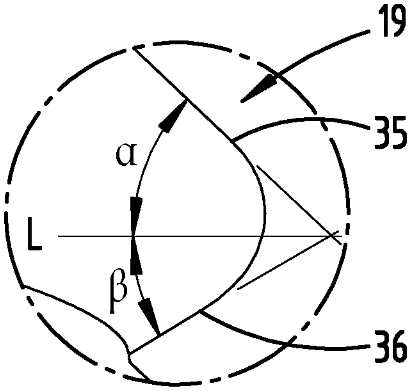
Figure 21:
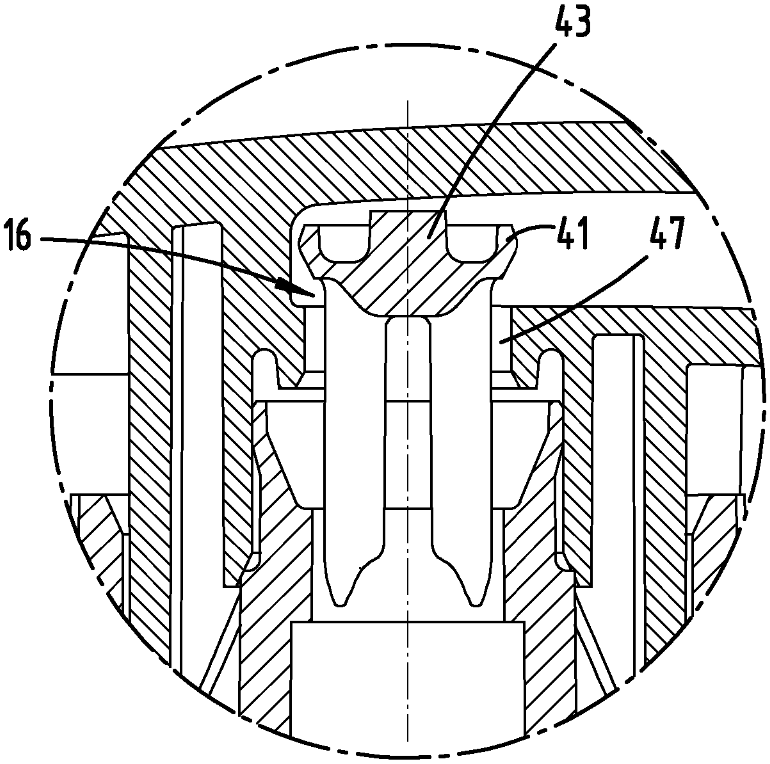
Figure 22:
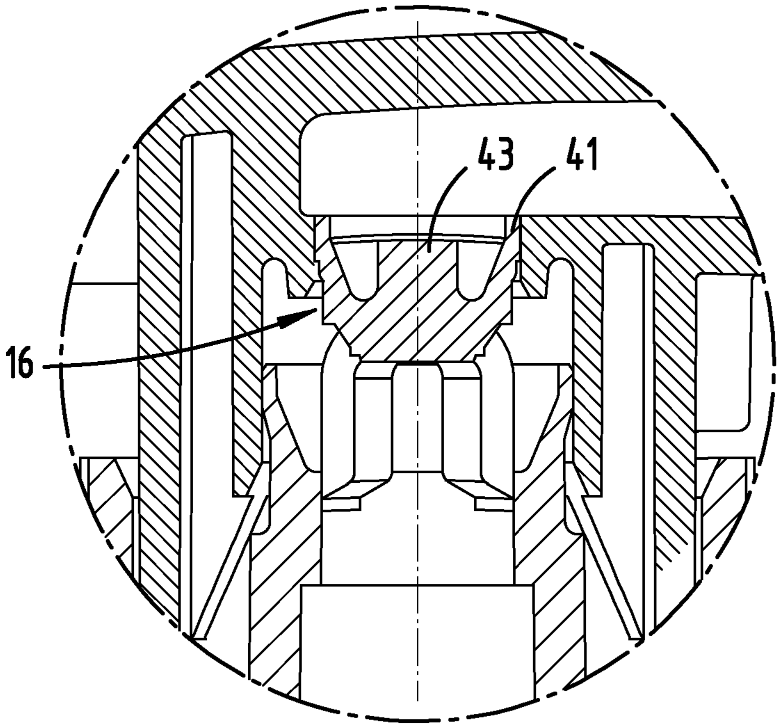
Figure 23:
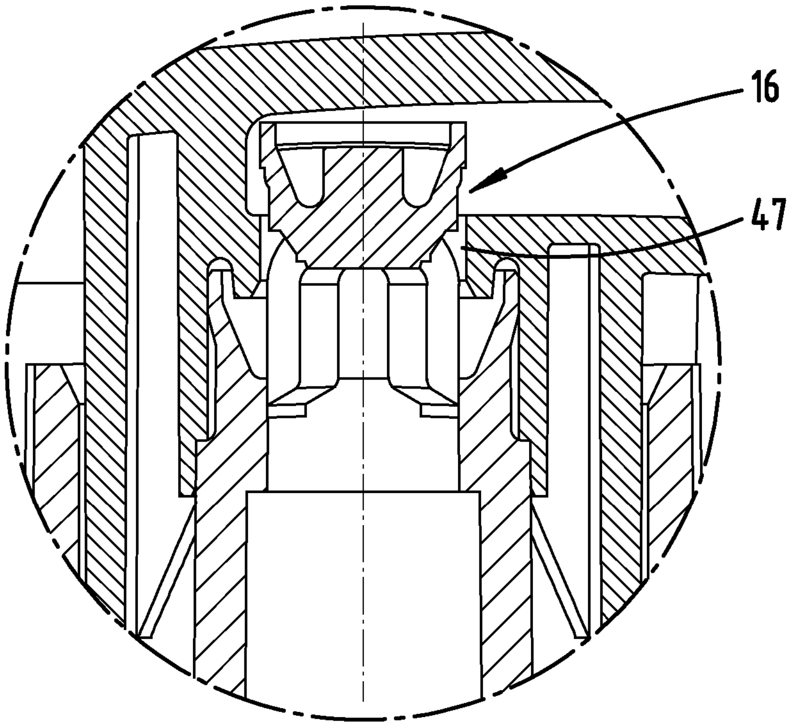

FIG. **4*a*** a perspective view from below on the pump head;

FIG. 5 a vertical section through the pump, the piston and the pump had been in the upper starting position, the pump head being locked in the upper position;

FIG. 6 a view according to FIG. 5, the pump had been in the unlocked position;

FIG. 7 a view according to FIG. 6, at the beginning of the pumping stroke, the outlet valve being in the open position;

FIG. 8 a further view according to FIG. 7, at the end of a pumping stroke, the outlet valve being still in an open position and the inlet valve being closed;

FIG. 8*a* an enlarged view of a pump part, which may come into sealing engagement of the sealing lip pf the bellows;

FIG. 9 a view according to FIG. 8, with the beginning of the return stroke, the outlet valve being closed and the inlet valve being still closed;

FIG. 10 a further view according to FIG. 9, at the end of the return stroke, the inlet valve being in an open position;

FIG. 11 an enlarged view as indicated by the dash-dotted line XI in FIG. 6;

FIG. 12 an enlarged view according to FIG. 11; but according to the dash-dotted line XII in FIG. 7;

FIG. 13 a cross section according to the line XIII-XIII in FIG. 10;

FIG. 14 a perspective view of the pump head, showing especially the design for locking in the starting position of the pump head;

FIG. 15 a perspective view in part from above of a pump part having the receiving space for the rim at the pump head making up for the locking;

FIG. 16 a cross section through the pump head according to the line XVI-XVI indicated in FIG. 5;

FIG. 17 a view according to FIG. 16, after having the pump head turneb for about 90° in an unlocked position;

FIG. 18 two bellows as preferably used the embodiment of the pump shown, in an arrangement above each other, FIG. 19 the bellows according to FIG. 18, in a compressed state;

FIG. 20 an enlarged view of the part in the dotted dash line XX in FIG. 18;

FIG. 21 a partial view of the outlet valve, first embodiment, in an open position;

FIG. 22 the outlet valve in the closed position, concerning a further embodiment; and FIG. 23 the outlet valve according to FIG. 22 in an open position.

DETAILED DESCRIPTION OF PREFERRED EMBODIMENTS

Figure 1:
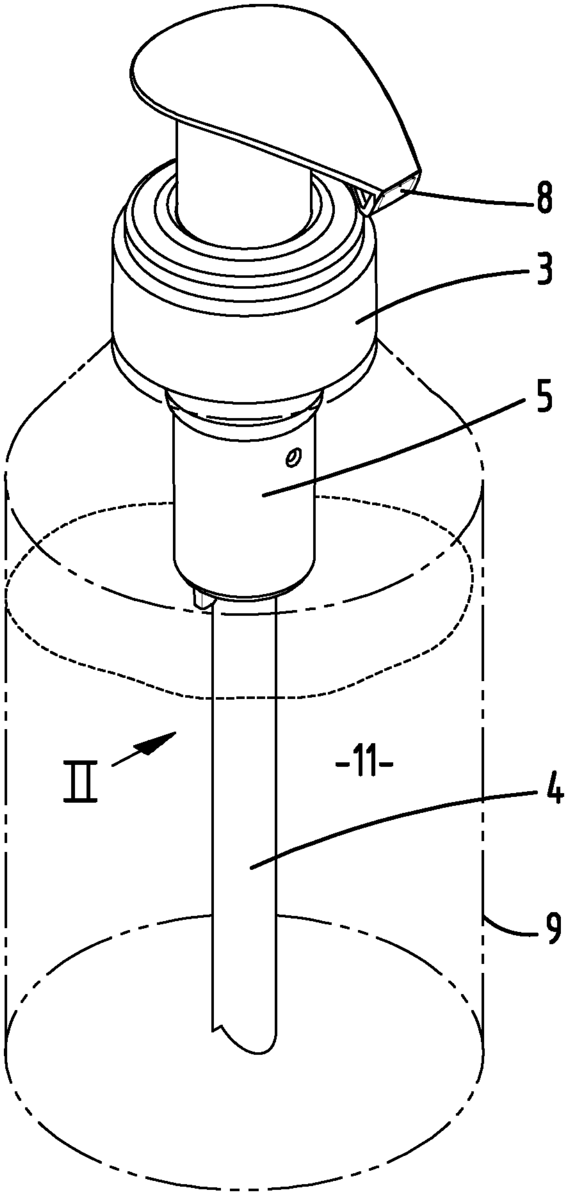
FIG. 1 a perspective view of a pump, allocated to a only in principle indicated receptacle.
Figure 2:
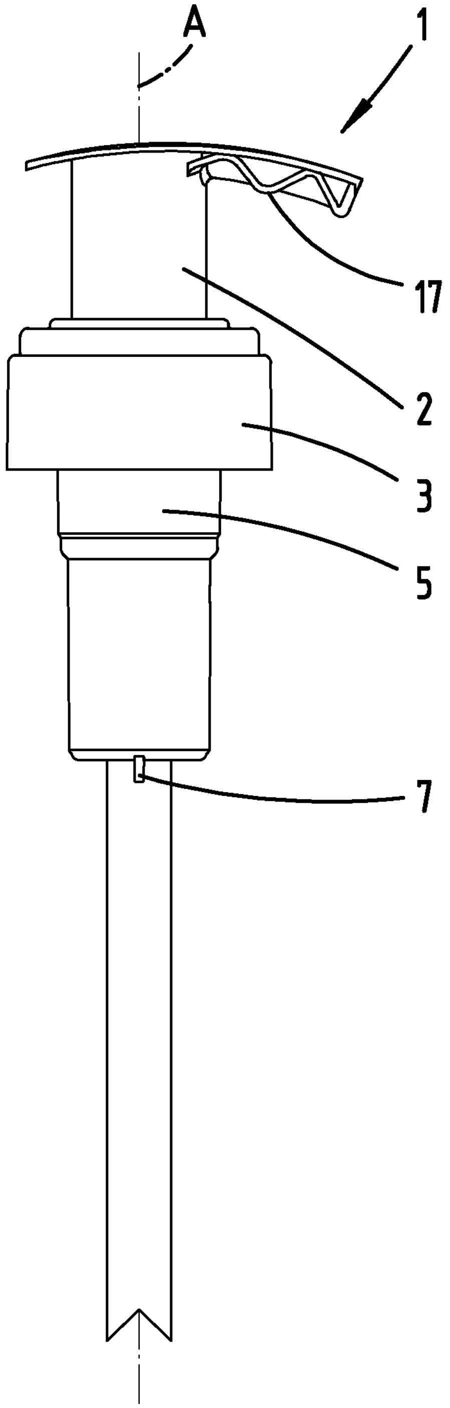
FIG. 2 the pump according to FIG. 1 in a side view.
Figure 3:
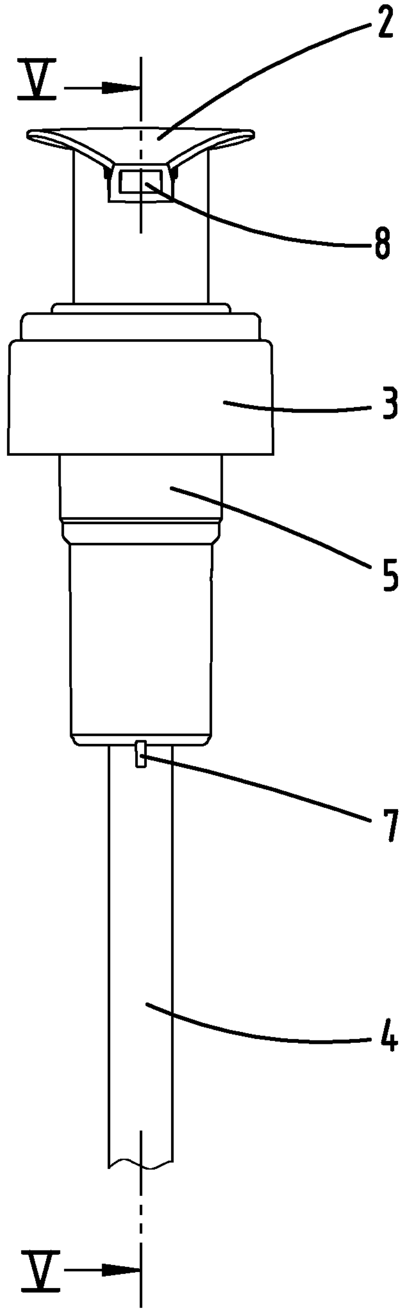
FIG. 3 the pump according to FIG. 1 or FIG. 2 in a front view.

With reference first to FIGS. 1 to 3 is shown and described a pump 1 with a pump head 2 and a pump housing part 3. The pump further may have a suction tube 4 as shown in the embodiments. However, the pump 1 may also work without the suction tube 4. Below the pump housing part 3 a pump chamber part 5 is visible in FIGS. 1 through 3. The pump chamber part 5 may have in its lower part a hollow receiving part 6 (see e.g. FIG. 5) for receiving and holding the suction tube 4. In the transition area between the pump chamber part building the pump chamber with a greater inner diameter than has the receiving part, a rib 7, visible at the outside, may be provided for.

The rib 7 may have a stabilization purpose and/or providing an means for orientation of the pump when assembling the pump.

The pump described above and below is preferably a pump having most or all parts as plastic parts. Further preferably, most or all of the parts are of polyethylene. Especially is preferred to have the restoring means, especially the bellows, made from polyethylene.

Such pump may have a dispense volume at a pumping stroke of some milliliters, for example 1,5 to 3 ml, more preferably 2 ml. Nevertheless, even greater volumes can be handled, such as for example 4 ml or more.

The pump head 2 has further an outlet opening 8.

The pump 1 may be assigned to a receptacle 9 shown by a dashed line in FIG. 1. The receptacle may be of very different shape. The combination of the pump 1 with the receptacle 9 may be means of a screw adaption as shown in the embodiments. The adaption may also be e.g. by being crimped on or pressed on.

In the receptacle 9 a fluid 11 like a lotion fluid, a soap or similar may be contained, which is pumpable by means of the pump 1 out of the receptacle 9. The fluid will be dispensed through the outlet opening 8 in the pump head. The outlet opening 8 is the end of an outlet channel 10, now with reference for example to FIG. 5 in the pump head 2.

With further reference to FIG. 5, generally the fluid to be pumped out of the receptacle 9 may flow through the suction tube 4, an inlet valve 12, being provided for in a lower part of a pump chamber 13. Further, upon a pumping stroke moving the pump head 2 together with a piston body 14 having the pump piston 15 from the starting position as for example shown in FIG. 6 down to a lower end position as for example shown in FIG. 8, the fluid will further flow through the internally hollow piston body 14 and an outlet valve 16 of the pump chamber 13 through the pump head fluid channel 10 for being finally dispensed at the outlet opening 8.

The pump head part having predominantly the pump head fluid channel 10 may have outside to the fluid channel 10 a stabilizing rib 17. Such stabilizing rib may be provided for with an extension in a length direction of the fluid channel 10 on both sides outside to the fluid channel 10. As shown and preferably, the stabilizing rib has a wave-like pattern.

The pump 1 further may have a restoring means, which are given preferably as shown in this respect especially in FIGS. 4 to 10 and 18 to 20 by means of a bellows 18. Instead, there could be also at least concerning the embodiment with only one bellows described having a sealing lip 34, which could then be in a lower shoulder part of such spring, a usual spring, especially a plastic spring be provided for. As to such spring, however having not yet the mentioned sealing lip, is for example to refer to WO 2020/156933 A1.

The pump 1 is preferably built by several in general cylindrical parts, being concentric to each other. They are all arranged preferably with a coincident middle axis, coincident with the geometrical axis A.

Figure 4:
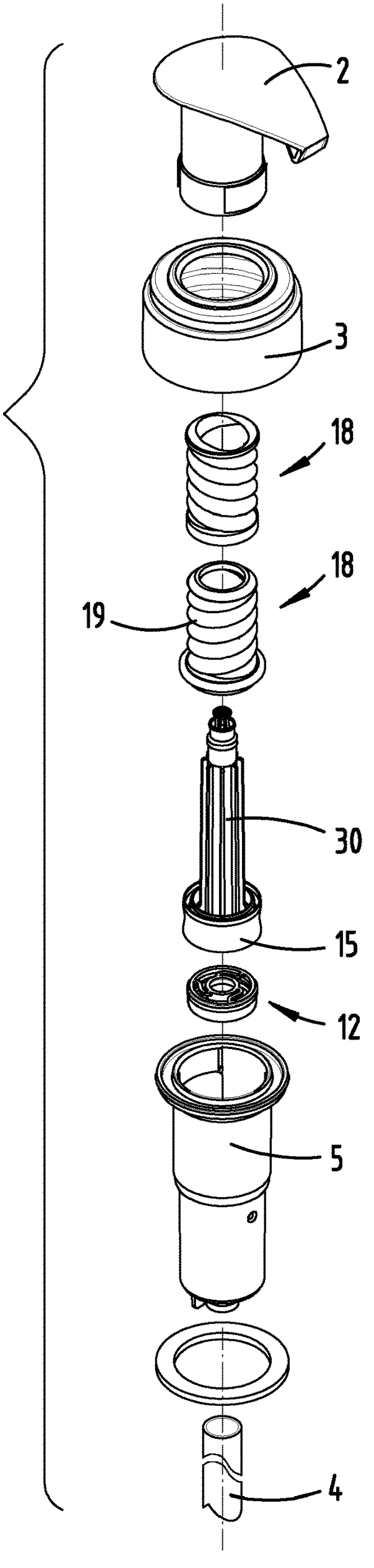
FIG. 4 an explosion view of the parts of the pump.
Figure 4A:
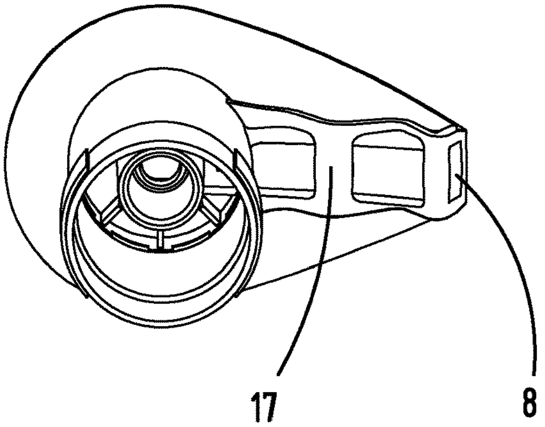

As shown in FIG. 4 and in more detail in FIGS. 5 to 10, preferably and at the embodiment so far shown in the drawings two bellows 18 are provided for, arranged one above the other. The bellows have a certain number of bulges 19, for example three to seven, more preferably about five bulges each. It can be even more, up to 10 or more bulges 19 be realized at each one of the bellows.

The wall of the bellows providing the bulges is preferably a closed wall over its whole vertical and circumferential extension.

Each of the bellows 18 is preferably an independent bellow. Preferably they are even in the assembled state for example shown in FIG. 7, not connected to each other, but are only lying with upper and lower abutment surfaces 20, 21 on each other.

The upper bellows 18 is in abutment engagement with the pump head 2. It may, as it is shown in the embodiment, in this respect have an upper shoulder 22.

The shoulder may be an enlarged terminal part of the bellows 18, having as shown in the drawings a for example rectangular cross-section. The shoulder may provide an abutment surface 23, which more preferably, as shown, extends in a right angle to the middle axis A. A counter abutment surface 24, given preferably at the pump head 2 does extend preferably the same way.

The lower bellows 18 has preferably a lower shoulder 25, being in abutment engagement with a housing part 26. The housing part 26 is more preferably, as it is also given at the shown embodiments, the pump chamber part 5. The housing part 26 or the pump chamber part 5 respectively has a protruding inward rest shoulder 27 against which the lower shoulder 25 of the lower bellows 18 may rest.

The housing part 26 or more specifically the pump chamber part 5 respectively will not move during a pumping stroke relative to the receptacle 9.

The piston body 14 does preferably have at its lower end the piston 15. The piston 15 is predominantly for reducing the volume of the pump chamber 13, when moving from an upper starting position as for example shown in FIG. 7 to a lower end position as for example shown in FIG. 8 during a pumping stroke.

The piston 15 has one or more sealing lips 28 being in sealing engagement with an inner surface of the pump chamber part 5.

The piston body 14 further has a tube-like extension 29, which emerges from the piston 15 and does end at or with the outlet valve 16.

The tube-like extension is provided for by a tube-like wall 30.

The one or more bellows are received within an angular room provided for preferably between an outer surface of the wall 30 and an inner surface of a wall 31 of the pump head 2, extending downward, against an dispensing direction of the fluid 11 in the extension 29 and/or an inner surface of a pump part or more specifically the pump chamber part 5. This inner surface of the pump part is above the wall region of the pump chamber part 5, which does actually provide the inner surface for the pump chamber 13 against which the piston 15 is in sealing engagement, preferably by means of its sealing lips.

Preferably and as shown in the drawings, the one or more bellows have first the purpose for providing a restoring force. The bellows do not preferably be in contact with the fluid to be dispensed. However, a further purpose may also be given as described below, especially in terms of providing a sealing, in the given case additional, a sealing in cooperation with the piston.

The bellows, preferably at the shown embodiment the lower bellows 18 may have a sealing lip 32 for an engagement with the piston 15 or a respective part of the piston.

The sealing lip 32 is preferably a circumferential continuously running, in general cylindrical part extending downwards from the lower shoulder 25 of the bellows. The bellows is made from elastic plastic material. The lip 32 therefore is also elastic.

The sealing lip 32 may be in an engagement with an outer surface of the piston, which outer surface is preferably radially inward to the sealing lip 28 of the piston. In case there are upper and lower sealing lips 28, more preferably, the engagement is radially inward to the upper sealing lip 28 of the piston 15.

The piston 15 may have a circumferentially continuously given groove 33, wherein an outer wall of the groove 33 may provide for the sealing lip 28 and an inner wall of the groove 33 may be providing for the surface being in sealing engagement with the lip 32 in the said upper, starting position of the piston 15.

The surface of the piston 28, the lip 32 is in engagement with, can as such be also be given at an upstanding wall, which may have on its further inner side a second groove 34.

Still further, the lip 32 and/or the surface of the piston 15, the lip 32 is in engagement with, may be designed step-like. This is shown in principle in FIG. 8*a*, here in a position, in which the piston is in the lower end position.

As it is to see, a respective wall part of the piston may have a step s in the vertical section shown in FIG. 8*a*. Therefore, upon further movement of the piston upward first the outer surface of the part having the smaller diameter will come in a sealing contact with the lip 32 and thereafter upon further movement of the piston into the upper starting position the part having a broader extension radially outwards, with respect to the middle axis A, or is extending more outward than the upper part. Thereby, a possible two stage sealing engagement with the lip 32 may be reached.

It can be the case, that the restoring force of the bellows 18 is always strong enough to move the piston in the second position with the higher sealing force. It might be also the case that during normal use the second sealing position is not reached but that this second sealing position is only given once a filled receptacle which such pump leaves the factory. Thereby, during transport etc., until first use by user, a very tight sealing may be given.

As it is, for example, shown in FIGS. 18 and 19, the bellows 18 may have thread-like running bulges 19.

It is preferred, that in case of the two bellows 18 as described before, a pitch p of such thread-like running bulges is opposite on both the bellows 18 being one above the other. Therefore, a possible turning action, when compressing the bellows 18 is balanced thereby.

A further aspect of the invention in terms of the bellows is a surface angle $\alpha$ or $\beta$ respectively of the surfaces of such bulges.

Preferably such bellows 18 has different angles as to the surfaces, an upper surface 35 and a lower surface 36, of a bulge 19. One or more or all of the bulges 19 may have this kind of different angles.

A bulge 19 is having in general in a cross section an upper straight surface 37 and a lower straight surface 38. These surfaces 37, 37 do merge radially outward, as well as radially inward, by a curvature as shown. Looking at the said straight surfaces in a longitudinal cross section of such bulge or the bellows as such, a first acute angle $\alpha$ in said cross section between the upper straight surface 35 and a line L being at a right angle to a compression direction or the longitudinal axis A is larger than a second acute angle $\beta$ in said cross section between the lower straight surface 36 and the line L. Thereby, during compression of the bulge 19 a controlled wrapping is initiated. The wall part having concerning the straight surface as explained the smaller acute angle is less rigid than the wall part of the bellows with the surface having the greater acute angle and will therefore first bend upon respective force.

Whereas the angle $\alpha$ might be in a range of 35 to 50°, more specifically 38 to 48°, even more specifically 40 to 45°, further preferably about 43°, the angle $\beta$ might be in a range of 20 to 34°, more specifically 25 to 32°, even more specifically 28 to 32° and further preferably about 30°.

Concerning the surfaces 20 and 21, as it is shown in FIG. 5 for example, it is preferred, that they extend at least in part, further preferably on the outside part of the surface, in a oblique direction in view of the central axis A. Thereby, as it is also visible from FIG. 5, in this case the upper bellows 18 does centralize the lower bellows 18 such that they are nested together and cannot move relatively to each other in a radial direction. These oblique surfaces may merge into a surface extending horizontal or at a right angle to the axis A.

Of further importance is an even more advantageously sealing feature which can be provided for also with an embodiment having only one bellows or even a plastic spring as already mentioned. More preferably however it is given combined with the two bellows as shown here.

Further, the sealing feature might be combined with such bellows or a plastic spring, having the sealing lip 32 or not.

This feature concerning a possible further sealing is between the pump head more specifically the wall 31 of the pump head, providing further preferably a part of an outer surface of the pump head in the upper starting position and pump part 3, being preferably a cap, such as a screw cap.

The pump part 3 or the cap respectively has at its inner edge an engaging wall 37, in a cross section as shown in FIG. 5 for example, an oblique extending free ending wall part 38. The wall part 38 is extending oblique, preferably at an angle of 40 to 50°, with respect to the axis A, and more preferably 45°, such that it runs from a higher radially outward diameter to a lower radial inward diameter. Lower is hereby referred to being against the dispensing direction of the fluid in the hollow piston part.

The wall part 38 therefore has first as such as certain flexibility, when the pump head is possibly engaging with the wall part 38 when moving downwards, second, when engaging especially a shoulder 39 provided for at the wall 31, in an upward movement direction of the pump head 2 a certain stiffness. Since the shoulder 39 tends in this case to bend the wall 37 upwards, this results in a narrowing of the free diameter at the inner free edge 40 of the wall 37 and is therefore enhancing the engagement between the wall 37 and the wall 31.

This engagement is given by the restoring force of the one or more bellows 18 or the spring.

Not only for this purpose but generally it is preferred, that the bellows 18 or the spring is assembled into the pump with some preload. This means, even in the most extended position, in general the upper starting position mentioned, the bellows is not completely extended but is still effecting some bias.

Due further to the comparatively small free edge surface of the wall part 38 which makes up for the engagement between the wall part 38 and the wall 31, a comparatively high surface pressure is reached which makes up as such also for a good sealing between said parts.

At the shown embodiment and preferably the piston body 14 is unitary, further preferably material uniform one piece made with the pump piston 15, wherein the piston body 14 especially provides the tube-like extension with the inner space for delivering the fluid into the outlet channel 10 as described.

The outlet valve is especially shown in FIGS. 5 to 12, concerning a first embodiment and FIGS. 21 to 23, concerning a second embodiment.

Preferably, not necessarily combined with the one piece design with the pump piston 15, the piston body 14 is unitary one piece with the outlet valve 16. As it is shown in more detail in FIGS. 5 to 12 and 21 to 23, the outlet valve 16 may consist of a disc-like valve part 41 which has preferably a circumferential outer upward protruding rim part 42. Preferably centrally to the disc-like plate part 41 can be provided for a stem part 43. The stem part 43 may further protrude upward over the rim part 42. The stem part 43 may serve as an upper stop in the opening position of the outlet valve 16. However, this opening position may additionally or instead also be provided for by abutment of an inner skirt, preferably a second inner skirt 44, on an abutment shoulder 45 provided for in an upper part of the pump body, especially at the inner concentric wall 29 of the pump body.

As far as above and below is referenced in view of the shown pump 1 "above" or "below", this is always meant in respect of the fluid flow upon a pumping stroke. The fluid flows from below to above within the pump body and then preferably after having gone through the area of the outlet valve 16 generally horizontal and radially outward with respect to the central geometric axis A.

The outlet valve 16 further cooperates with a sealing rim 46 provided for in the pump head 2. Specifically, the sealing rim 46 is given by an opening 47 of the outlet channel 10 in the pump head. The opening 47 is preferably a short axial tube-like region in the pump head 2. The opening 47 is further given at the lower inner surface of the pump channel 10. The outlet valve 16 extends within, and at least in the opening position, through the short axial tube-like region.

The disk-like valve part 41, in one of the embodiments, see especially FIG. 11, lies on said rim 46 by means of an edge 48 designed at the outer surface of the disk-like valve part 41. As one can see especially in FIG. 11, the outer surface is in the shown cross section convex designed, providing such the edge 48.

Probably, as also shown in FIG. 5, in the closed position of the outlet valve 16 according to this embodiment, an upper part of the disk-like valve part 41 is still within the pump channel 10 in the closed position of the outlet valve.

The disk-like valve part 41, and this is given for both the embodiments, in this respect described, has lower, one or more pillar parts 49, which combine the outlet valve 16 with the piston body, preferably the tube-like wall of the piston body. The pillars, in case there are several pillar parts, leave a free space between them and a free space around them for allowing the fluid to flow around the pillar parts and, in the opening position of the outlet valve further around the outer surface of the disk-like valve part 41 for finally going into the pump head fluid channel 10.

In case of one pillar part 49, the one pillar part 49 is also such arranged that it allows the flowing around of the fluid in the indicated way.

The one or several pillar parts 49 extend from an area within the wall 29 up to above an upper rim 50 of the pump body. The disk-like valve part 41 is preferably, as shown at the embodiment, extending with a distance to said upper rim, above the upper rim.

The upper rim 50 may be built by a flexible lip part providing further the upper end of the pump body, especially the said inner concentric wall. The flexible lip part may be sealingly engage an inner surface of a respective skirt part, preferably the third inner skirt part of the pump head 2.

The inlet valve 12 is further especially shown e.g. in FIG. 7. The inlet valve 12 at this first embodiment has a preferably pot like sealing part 51 with a comparatively larger diameter D1 providing preferably in terms of a pot wall a downward extending sealing wall, extending into an axial opening in the bottom part of the pump chamber. The diameter D1 is comparatively large in view of the diameter D2 of the pump chamber as such, being the same diameter D2 along which the pump piston is moving. The relation D1/D2 is preferably between 0,3 and 0,5, more preferably about 0,4.

The inner sealing part 51 of the inlet valve 12, having the said diameter D1, is bound to an outer attachment part 52 of the inlet valve 12 by means of flexible arms 53. The flexible arms 53 extend partly in circumferential direction in order to have a greater length of the flexible arms 53.

The outer attachment part 52 is sleeve-like and extends preferably further below to the inner sealing part 50. An inner surface of the attachment part 52 is structured with one or more ribs 54, in order to engage an outer surface of a rising wall part 55 of a bottom of the pump chamber. The rising wall part 55 is preferably in the section shown for example in FIG. 7 an outer leg of an altogether U-shaped wall extending with its inner leg into an attachment part 52 for holding or attaching the suction tube 4 as far as provided for. Instead it could be also only the transition part into the receptacle or specifically a storage room of the receptacle.

The attachment part 52 further leaves a circumferential space 56 between an outer surface of the attachment part 52 and an inner surface of the pump chamber. This circumferential space may serve to receive a sealing lip, in the given case a lower sealing lip of the piston, allowing the piston to move in the lower end position upon a pumping stroke.

Preferably as shown in the embodiment, the piston has two sealing lips 28, namely a lower sealing lip and an upper sealing lip. The sealing lips extend starting from a plate-like middle portion of the piston in opposite directions.

In the upper position of the piston and the starting position of the pump head, the upper sealing lip may rest against a lower surface of the abutment part or shoulder respectively of the restoring means, especially the bellows or the spring. This could be given as well in a case the sealing lip 32 is not provided for.

In the pump chamber body is further preferably provided for an opening 56, which is further preferably in the non-actuated position, the upper position of the pump head and the pump body, overlapped by one or both of the said sealing lips of the piston. Therefore, in this position, outside air may not come into the pump chamber. However, in a lower position of the pump body and the pump head, as for example shown in FIG. 8, the opening 56 is freed from the overlapping and air may flow out given by the compression and further, be sucked back over a certain way of the piston body and the piston when moving from the lower end position to the starting position. Such air may flow through the attachment between the pump housing part 3 and the receptacle, which is not made such tight that no air could flow through.

The receptacle 9 may have a neck 57 as indicated in FIG. 5. Between an upper surface of the neck 57 and the respective pump part, at the given embodiment a shoulder of the pump chamber part 5, a sealing ring may be provided for.

With reference especially to FIGS. 14 through 17, more specifically the locking of the pumping head in the upper starting position is explained.

The pump head 2, for example and preferably at its pump head skirt 31, may have a skirt rim, being received in the locked position as also shown in FIG. 5 between a stop, preferably provided for at the pump housing part 3, by the free end of the wall 38, and a shoulder 59 being provided for at the preferred embodiment at the pump chamber body 5.

The locked position is further preferably limited in circumferential direction by a stop 60, also provided for at the pump chamber body 5 or another respective pump part. An end surface 61 of the skirt rim 58 may rest against the stop 60 when the pump head 2 is fully turned in the locked position.

There might be provided for a further stop 62, limiting the turning of the pump head into the unlocked position.

A further embodiment of the outlet valve 16 is shown in more detail in FIGS. 22 and 23 in the closed or open position respectively. This outlet valve 16 differs from the first described outlet valve 16 in that the disk-like valve part 41 is even more bowl-like shaped and is preferably completely received in the opening 47 in the closed position of the outlet valve 16 as shown in FIG. 22. Further, it might be, which is also possible for the first explained embodiment of the outlet valve, that an upper surface of the disk-like valve part 40 may serve as a stop for the opening position of the outlet valve, as shown in FIG. 23. The stem part 43 therefore is at this embodiment not extending upwards to the upper surface of the disk-like valve part 41. However, in both embodiments, the stem part 43 provides a stabilization of the disk-like valve part 41. The embodiment of the outlet valve according to FIGS. 22 and 23 might especially by preferred in case higher opening forces are required. This might be combined with a higher sealing efficiency.

The second embodiment of FIGS. 22 and 23 has a comparatively long rather cylindrical sealing surface in the closed position, provided over the whole or a substantial length of the opening in the outlet channel 10.

REFERENCE NUMERALS

1 pump
2 pump head
3 pump housing part
4 suction tube
5 pump chamber part
6 receiving part
7 rib
8 outlet opening
9 receptacle
10 outlet channel
11 fluid
12 inlet valve
13 pump chamber
14 piston body
15 pump piston
16 outlet valve
17 stabilizing rib
18 bellows
19 bulge
20 abutment surface
21 abutment surface
22 upper shoulder
23 abutment surface
24 counter abutment surface
25 lower shoulder
26 housing part
27 rest shoulder
28 sealing lip
29 tube-like extension
30 wall
31 wall of pump head
32 sealing lip
33 groove
34 groove
35 surface, upper
36 surface, lower
37 engaging wall

38 wall part
39 shoulder
40 inner free edge
41 disk-like valve part
42 rim part
43 stem
44 inner skirt
45 abutment shoulder
46 rim
47 opening
48 edge
49 pillar part
50 upper rim
51 pot like sealing part
52 attachment part
53 flexible arm
54 rib
55 wall part
56 opening
57 neck
58 skirt rim
59 shoulder
60 stop
61 end surface
62 further stop
p pitch
A geometrical axis
s step
α angle
β angle
L line

The invention claimed is:

1. A pump (1) for dispensing a fluid, comprising:

a pump head (2), a piston body (15) with a piston, a pump chamber (13) limited by a pump chamber body (14), an inlet valve (12) and an outlet valve (16), the piston being moveable by respective movement of the pump head (2) between an upper starting position and a lower end position, wherein a return stroke force for a return stroke from the lower end position into the upper starting position is provided by two bellows arranged one above the other and comprising a first bellows and a second bellows, each of the bellows (18) is an independent bellow (18), and the bellows are not connected to each other but are only lying with upper and lower abutment surfaces on each other, wherein each of the bellows (18) is folded up, when moving the pump head (2) into the lower end position, by exerting a compression force on the pump head (2), the first bellows receiving the compression force by direct engagement with the pump head (2), the second bellows receiving the compression force only by engagement with the first bellows.

2. The pump (1) according to claim 1, wherein the bellows (18) has on a lower end a first sealing lip (32) engageable in the starting position by an engagement part of the piston, wherein the first sealing lip (32) is a circumferential continuously running, generally cylindrical part extending downwards from a lower shoulder and being in an engagement with an outer surface of the piston, the outer surface being radially inward to a second sealing lip (28) of the piston (15), and wherein the piston (15) has a circumferentially continuously given groove (33), wherein an outer wall of the groove (33) provides for the sealing lip (28) and an inner wall of the groove (33) provides for the surface being in sealing engagement with the first sealing lip (32) in the upper, starting position of the piston (15).

3. The pump (1) according to claim 1, wherein the pump head (2) has a pump head wall (31) extending downward from the pump head (2), in sliding engagement to a pump housing part (3) being fixed during a pumping stroke and a return stroke, wherein a return stroke force for the return stroke from the lower end position into the upper starting position is provided for by a restoring spring, wherein the pump housing part (3) has a sealing wall being in a sealing engagement with a sealing shoulder (39) on the pump head wall (31) in the starting position, biased in the sealing engagement by a restoring means (18), wherein the pump head wall provides an outer surface of the pump head (2) in the wall (37), extending in a cross section in an oblique extending free ending wall part (38), at an angle of 40-50° with respect to the axis (A), such that the engaging wall runs from a higher radially outward diameter to a lower radially inward diameter, and wherein the wall part (38) has a certain flexibility when the pump head is possibly engaging with the wall part (38) when moving downwards and a certain stiffness when engaging the shoulder (39) provided for at the wall (31), in an upward movement direction of the pump head (2), in which case the shoulder (39) tends to bend the wall (37) upwards, resulting in a narrowing of a free diameter at an inner free edge (40) of the wall (37), thereby enhancing the engagement between the pump head wall (37) and the engaging wall (31), which free edge (40) further makes up for the engagement between the wall part (38) and the wall (31).

4. The pump (1) according to claim 1, wherein a bulge (19) of the bellows (18) has in a cross section an upper straight surface (37) and a lower straight surface (38), which merge radially outside by a curvature, wherein a first acute angle (α) in said cross section between the upper straight surface and a line being at a right angle to a compression direction or a longitudinal middle axis of the bellows (18) respectively is larger than a second acute angle (β) in said cross section between the lower straight surface (38) and said line (1), and wherein the angle (a) is between 38° and 48° and the angle (B) between 25° and 32°.

5. The pump according to claim 1, wherein the sealing lip (32) and/or the engagement part is step like formed such that in one of the engagement positions a higher sealing force is reached than in the other.

6. The pump according to claim 1, wherein the bellows have bulges and wherein the bulges extend threadlike in circumferential direction of the bellows such that one bulge may run from a lower end surface of the bellows to the upper end surface of the bellows.

7. The pump according to claim 1, wherein the bellows has two or more bulges running thread-like.

8. The pump according to claim 1, wherein the bellows being arranged one above the other each have thread-like running bulges.

9. The pump according to claim 8, wherein the bulges of each of the bellows have an opposite pitch.

10. The pump according to claim 1, wherein the bellows are nested together on their adjoining surfaces.

* * * * *